United States Patent Office 2,939,212
Patented June 7, 1960

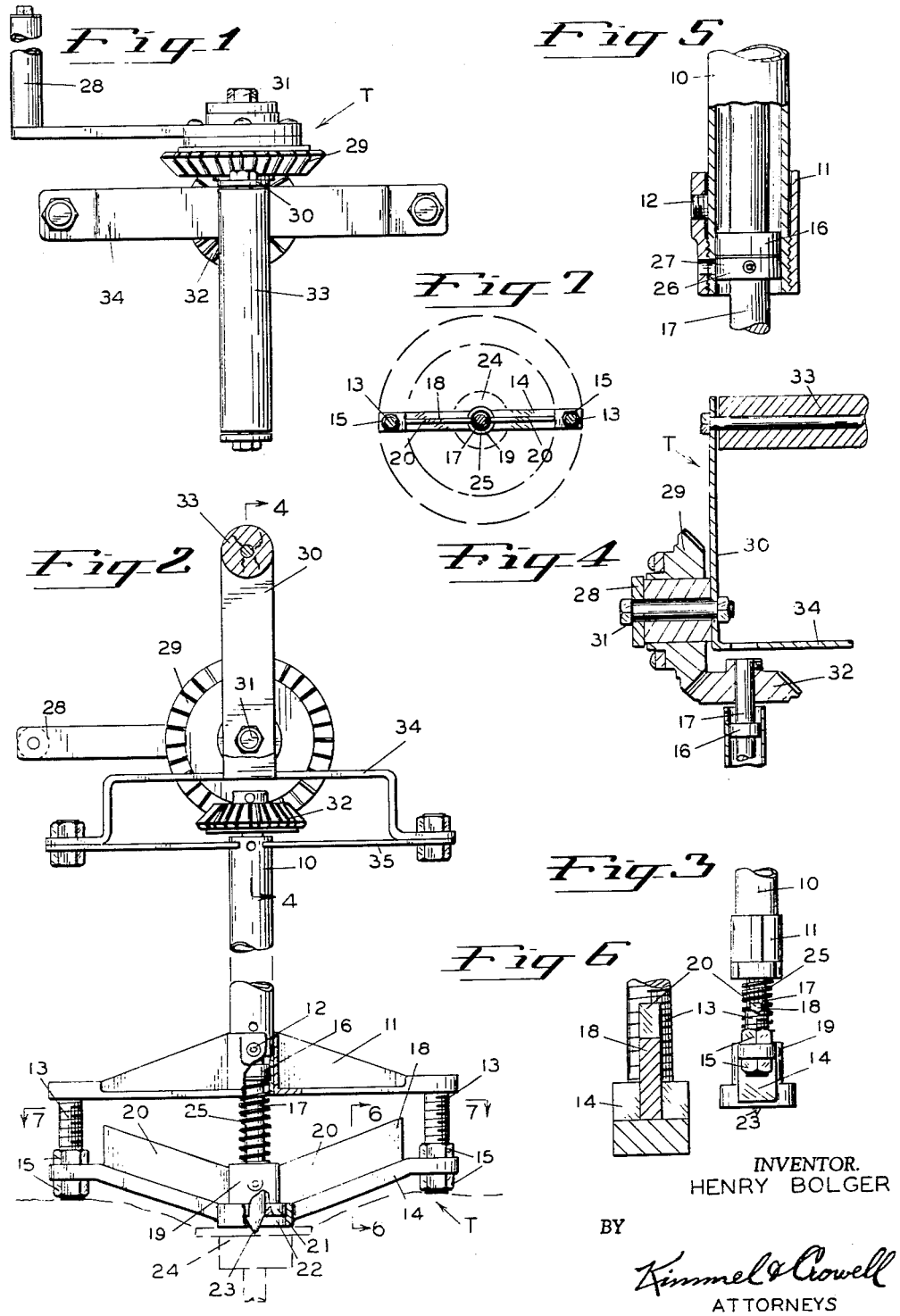

2,939,212

LAWN TRIMMING DEVICE

Henry Bolger, 3706 NE. 116th Ave., Portland, Oreg.

Filed Dec. 30, 1958, Ser. No. 783,905

6 Claims. (Cl. 30—240)

The present invention relates to a lawn trimming device which is particularly adapted for trimming away grass from around sprinkler heads and the like.

The primary object of the invention is to provide a trimming device for trimming away grass from around sprinkler heads so that the spray from the sprinkler head can spray unobstructed over the lawn.

A further object of the invention is to provide a trimming device of the class described above which is of a simple construction that can be hand operated.

Other objects and advantages will become apparent in the following specification when considered in light of the attached drawings, in which:

Figure 1 is a plan view of the invention;

Figure 2 is a fragmentary side view of the invention, partially broken away and in section for convenience of illustration;

Figure 3 is an edge view of the grass cutting head;

Figure 4 is a fragmentary vertical sectional view taken on line 4—4 of Figure 2, looking in the direction of the arrows;

Figure 5 is a side elevation of a modified form of the invention shown partially broken away and in section for convenience of illustration;

Figure 6 is an enlarged detail sectional view, taken on the line 6—6 of Figure 2, looking in the direction of the arrows; and Figure 7 is a horizontal sectional view, taken on line 7—7 of Figure 2, looking in the direction of the arrows.

Referring now to the drawings in detail wherein like reference characters indicate like parts throughout the several figures, the reference character T indicates generally a grass trimming device constructed in accordance with the invention.

The grass trimmer T includes a tubular stem 10 having a cross-head 11 fixedly secured to its lower end by a set screw 12.

Stud bolts 13 are formed integral with opposite ends of the cross-head 11 and extend downwardly therefrom. A transverse cutter bar 14 substantially V-shaped is adjustably secured to the bolts 13 by oppositely disposed lock nuts 15.

Journalled within bearings 16 mounted in opposite ends of the stem 10 is an operating shaft 17. Keyed to the lower end of the shaft 17 is a grass cutting blade 18 which includes a hub 19 having a pair of cutting blades 20 extending oppositely of one another and upwardly from hub 19. The blades 20 are adapted for shearing contact with the upper surface of the cutting bar 14, as best illustrated in Figures 2 and 6.

The lower portion 21 of the hub 19 is journalled in a bearing 22 formed at the point of the V-shaped cutting bar 14, as best illustrated in Figure 2. Extending down from the lower end of the shaft 17 is a centering point 23, which is provided to enter the central opening of the sprinkler head 24, the sprinkler head 24 being indicated by broken lines in Figures 2 and 7, centering the trimmer T in its operation.

Referring to Figure 2, the cutting blade 18 is held against the cutting bar 14 by a spring 25, seating against the bearing 16 at its upper end and against the hub 19 of the cutter blade 18 at its lower end.

Referring to Figure 5, a modified blade tensioning structure is illustrated wherein a collar 26 replaces the spring 25 bearing against the bearing 16 and locked on the shaft 17 in a definite position by the action of the set screw 27. The collar 26 will hold the cutting blade 18 against the cutting bar 14 in a predetermined position.

The shaft 17 is rotated by a hand crank 28 and pinion gear 29, which is journalled to the upright standard 30 on a spindle bolt 31. The gear 29 meshes with and rotates the pinion gear 32 keyed to the shaft 17, thus revolving the cutter blade 18 in shearing relation to the cutter bar 14, trimming the grass around the sprinkler head 24.

A horizontally disposed handle 33 is fixedly secured to the upright standard 30, as best illustrated in Figures 1, 2 and 4. The standard 30 is fixedly mounted on a cross bracket 34, which, in turn, is bolted to the cross head 35 formed on the top of the tubular stem 10.

In the use and operation of the invention, the centering point 23 is engaged in the opening of the sprinkler head 24. This centers the trimmer T which is held upright by one hand holding the handle 33 while revolving the crank 28 by the other. As the crank 28 is revolved, the handle 33 is also slowly revolved with the operator turning his body in a circle while revolving the crank 28 in its cutting operation so as to turn the cutter bar 14 and completely cut the grass surrounding the sprinkler head 24.

Having thus described the preferred embodiment of the invention, it should be understood that numerous structural modifications and adaptations may be resorted to without departing from the scope of the appended claims.

What is claimed is:

1. A lawn trimming devic comprising a frame, a transverse substantially V-shaped cutter bar secured to the lower end of said frame, a shaft journalled in said frame, a cutter blade conforming in configuration to said cutter bar secured to the lower end of said shaft for rotation in shearing relation with respect to said cutter bar, and means on said frame for rotating said shaft.

2. A device as claimed in claim 1 wherein said frame comprises an upright tubular stem having a cross-head mounted at each end thereof.

3. A device as claimed in claim 1 wherein said cutter bar is mounted on said frame for vertical adjustment with respect thereto.

4. A device as claimed in claim 1 wherein said shaft is provided with a centering point on its lower end for centering said cutter bar and said cutter blade with respect to a sprinkler head adjacent which the lawn is to be trimmed.

5. A device as claimed in claim 1 wherein means are provided for resiliently biasing said cutter blade into shearing contact with said cutter bar.

6. A device as claimed in claim 1 wherein means are provided on said frame for maintaining said cutter blade in shearing contact with said cutter bar.

References Cited in the file of this patent

UNITED STATES PATENTS

| | | |
|---|---|---|
| 395,524 | Thayer | Jan. 1, 1889 |
| 1,151,913 | Wagner | Aug. 31, 1915 |
| 1,375,195 | Wikstrom | Apr. 19, 1921 |
| 1,519,291 | Breit | Dec. 16, 1924 |